(12) United States Patent
Yamamoto

(10) Patent No.: US 7,396,615 B1
(45) Date of Patent: Jul. 8, 2008

(54) METHOD FOR PRODUCTION OF POLYELECTROLYTE MEMBRANES AND FUEL CELL

(75) Inventor: Tetsu Yamamoto, Kawagoe (JP)

(73) Assignee: BASF Fuel Cell GmbH (DE)

( * ) Notice: Subject to any disclaimer, the term of this patent is extended or adjusted under 35 U.S.C. 154(b) by 0 days.

(21) Appl. No.: 09/868,978

(22) PCT Filed: Dec. 11, 1999

(86) PCT No.: PCT/EP99/09831

§ 371 (c)(1),
(2), (4) Date: Sep. 24, 2001

(87) PCT Pub. No.: WO00/39202

PCT Pub. Date: Jul. 6, 2000

(30) Foreign Application Priority Data

Dec. 25, 1998 (JP) ................... 10-371554

(51) Int. Cl.
*H01M 2/00* (2006.01)

(52) U.S. Cl. ....................... 429/307; 429/304

(58) Field of Classification Search ................... 429/29, 429/30, 33, 39, 129, 188, 189, 304, 307, 429/344, 134, 310
See application file for complete search history.

(56) References Cited

U.S. PATENT DOCUMENTS

| 4,795,536 A | 1/1989 | Young et al. ................. 204/129 |
| 5,599,639 A | 2/1997 | Sansone et al. ............... 429/33 |
| 6,124,060 A * | 9/2000 | Akita et al. ................. 429/307 |
| 6,352,742 B1 | 3/2002 | Murata et al. |

FOREIGN PATENT DOCUMENTS

| WO | 96/13872 | 5/1996 |
| WO | 97/37396 | 10/1997 |
| WO | 98/14505 | 4/1998 |
| WO | WO/9814505 * | 4/1998 |
| WO | WO-98/52732 | 11/1998 |

* cited by examiner

*Primary Examiner*—Patrick Joseph Ryan
*Assistant Examiner*—Monique Wills
(74) *Attorney, Agent, or Firm*—Connolly Bove Lodge & Hutz LLP

(57) ABSTRACT

A method for producing a polyelectrolyte membrane, including the step of immersing a basic polymer such as a polybenzimidazole in a strong acid having a concentration sufficient to impregnate the basic polymer with six or more strong acid molecules per polymer repeating unit of the basic polymer at a temperature of not less than 30° C. for a period of 5 h or less, as well as a fuel battery having the polyelectrolyte membrane. Hence, the times required to immerse the basic polymers in the strong acids can be shortened and the proton conductivity of the polyelectrolyte membranes can be improved.

16 Claims, 3 Drawing Sheets

US 7,396,615 B1

METHOD FOR PRODUCTION OF POLYELECTROLYTE MEMBRANES AND FUEL CELL

BACKGROUND OF THE INVENTION

1. Field of the Invention

This invention relates to a method for the production of a polyelectrolyte membrane and to a fuel cell.

2. Related Art

A fuel cell has an electrolyte and a pair of electrodes separated by the electrolyte. In a fuel cell, a fuel such as hydrogen is supplied to one electrode, and an oxidizing agent such as oxygen is supplied to the other electrode. This will convert the chemical energy involving oxidation of the fuel to electric energy. Hydrogen ion (i.e., proton) permeates through the electrolyte while the reaction gases (i.e., hydrogen and oxygen) does not permeate through the electrolyte. Typically, a fuel-cell stack has a plurality of fuel cells, and each of the cells has an electrolyte and a pair of electrodes separated by the electrolyte.

As electrolytes for fuel cells, solids such as polyelectrolyte membranes or liquids such as phosphoric acid are used. Among these, the polyelectrolyte membranes have received attention as the electrolytes for fuel cells in recent years. For example, perfluorosulfonic acid polymers and complexes between basic polymers and strong acids are used as materials for the polyelectrolyte membranes.

The perfluorosulfonic acid polymer, typically, has a structure in which the side chain having a sulfonic acid group (e.g., a side chain having a sulfonic acid group bound to a perfluoroalkylene group) is bound to a perfluorocarbon skeleton (e.g., a copolymer of tetrafluoroethylene and trifluorovinyl). Since the sulfonic acid group can turn into an anion through the dissociation of its hydrogen ion, it shows proton conductivity.

The polyelectrolyte membranes comprising complexes of basic polymers and strong acids have been developed. In International Publication WO96/13872 and its equivalent U.S. Pat. No. 5,525,436, there is disclosed a method for producing a proton conductive polyelectrolyte membrane by immersing a basic polymer such as a polybenzimidazole in a strong acid such as phosphoric acid or sulfuric acid. The fuel cell employing such a polyelectrolyte membrane has the advantage that it can be operated at 100° C. or above.

In *J. Electrochem. Soc.*, Vol. 142, No. 7, 1995, ppL 121-L123, it is described that when a polybenzimidazole is immersed in 11 M phosphoric acid for at least 16 h, the polybenzimidazole will be impregnated with five molecules of phosphoric acid per unit.

Further, in International Publication WO97/37396 and its equivalent U.S. Pat. No. 5,716,727, there is described a method for producing a polyelectrolyte membrane by obtaining a solution of polybenzimidazole dissolved in trifluoroacetic acid, next by adding phosphoric acid to the solution, and subsequently by removing the solvent.

All the disclosures of WO96/13872, *J. Electrochem. Soc.*, Vol. 142, No. 7, 1995, ppL 121-L123, and WO97/37396 are incorporated into the present specification by reference.

Where the complexes between basic polymers and strong acids are to be put into practical use as the polyelectrolyte membranes for fuel cells, further improvements on their proton conduction are needed.

In addition, where such polyelectrolyte membranes are manufactured, it is required from the standpoint of their production process that the times of immersion of the basic polymers in the strong acids be brief. In *J. Electrochem. Soc.*, Vol. 142, No. 7, 1995, ppL 121-L123, a polybenzimidazole is immersed in phosphoric acid for at least 16 h. This is too time-consuming and the production process will prove to be inefficient.

SUMMARY OF THE INVENTION

This invention provides a method for producing a polyelectrolyte membrane, comprising the step of:

immersing a basic polymer in a strong acid having a concentration sufficient to impregnate the basic polymer with six or more strong acid molecules per polymer repeating unit of the basic polymer at a temperature of not less than 35° C. for a period of 5 h or less.

In the invention, the time of immersion is preferably 1 h or less.

Preferably, the strong acid is phosphoric acid; or alternatively, the strong acid is preferably sulfuric acid. It is further preferred that the strong acid be phosphoric acid having a concentration of not less than 80% by weight.

Preferably, the basic polymer is selected from the group consisting of polybenzimidazoles, polypyridines, polypyrimidines, polyimidazoles, polybenzthiazoles, polybenzoxazoles, polyoxadiazoles, polyquinolines, polyquinoxalines, polythiadiazoles, polytetrazapyrenes, polyoxazoles, polythiazoles, polyvinylpyridines, polyvinylimidazoles, and polybenzimidazoles.

This invention provides a fuel cell comprising a plurality of cells, wherein each of the cells is provided with a polyelectrolyte membrane produced by the method described above and a pair of electrodes sandwiching the polyelectrolyte membrane.

In this invention, the immersion time can be shortened to 5 h or less by setting the temperature to 35° C. or above at the time when the basic polymer is immersed in the strong acid. Accordingly, the production process can be made more efficient.

A large quantity of the strong acid can be allowed to impregnate the basic polymer, specifically at the ratio of six or more strong acid molecules per polymer repeating unit of the basic polymer, by adjusting the concentration of the strong acid. Accordingly, the proton conduction of the polyelectrolyte membranes can be improved and the output of fuel cells can be enhanced.

DETAILED DESCRIPTION OF PREFERRED EMBODIMENTS

Figure 1:
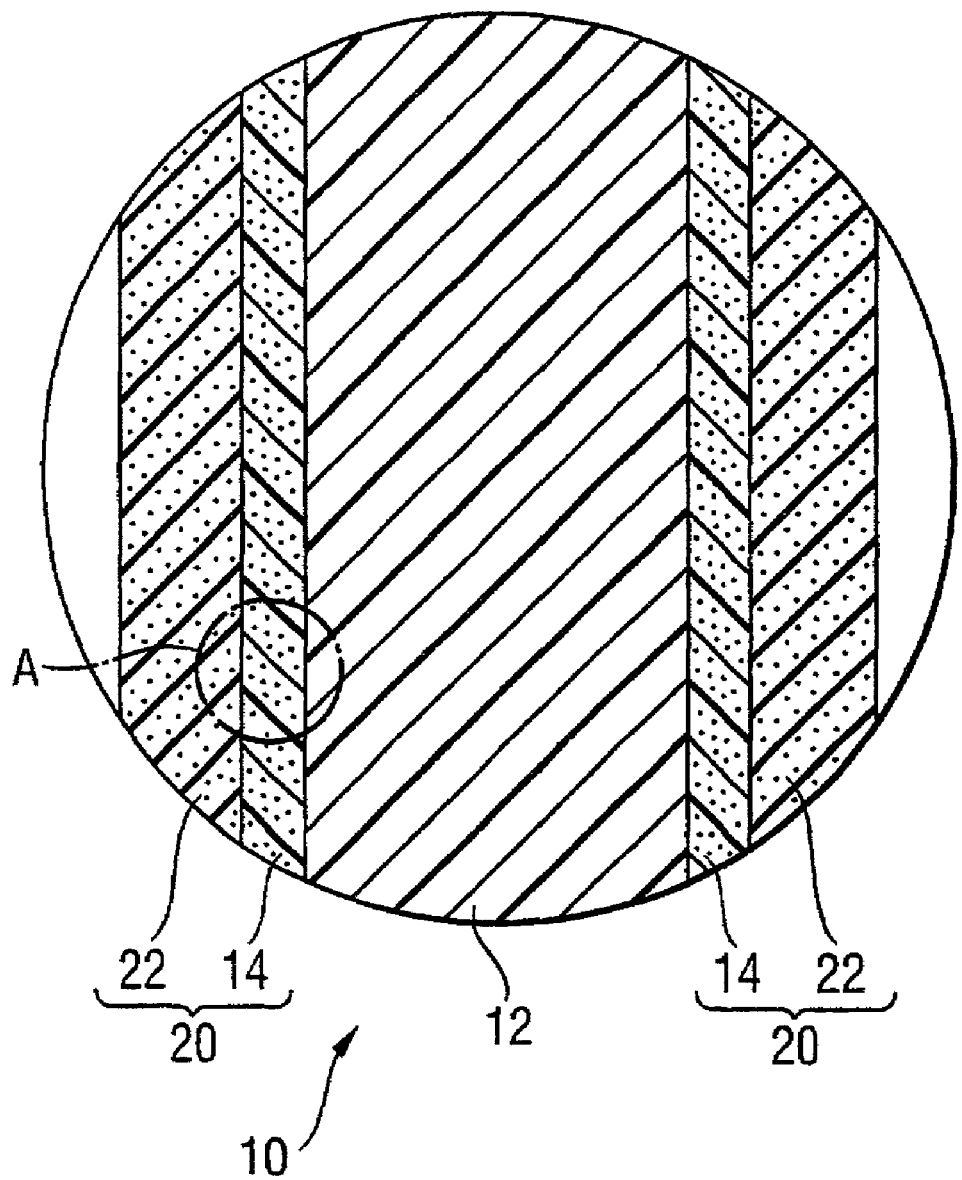
FIG. 1 is a cross-sectional illustration of the fuel cell.

This invention includes the step of immersing a basic polymer in a strong acid of a predetermined concentration at a temperature of not less than 30° C. for a period of 5 h or less. By carrying out the immersion step at 30° C. or above, it becomes possible to shorten the time needed to immerse the basic polymer in the strong acid; specifically, the time has turned out to be 5 h or less.

The immersion step is to be carried out preferably at 35° C. or above, more preferably at 40° C. or above, in particular preferably at 50° C. or above. As the temperature of the immersion step increases, the immersion times can be further shortened.

Thus, by raising the immersion temperature, the immersion time can be made 1 h or less, and can even be made 30 min or less. Shortening the immersion times improves the efficiency of the production process.

However, because the stability of the basic polymers and the safety precautions required to handle the strong acids at high temperatures should be taken into consideration, the immersion step is to be carried out at 200° C. or below, more preferably at 100° C. or below, and most preferably at 80° C. or below.

This invention includes the step of immersing the basic polymer in the strong acid having a concentration sufficient to impregnate the basic polymer with six or more strong acid molecules per polymer repeating unit of the basic polymer. As the concentration of the strong acid increases, the basic polymer can be impregnated with more strong acid. Thus, the impregnation quantity of the strong acid increases; and it improves the proton conduction of a complex between the basic polymer and the strong acid. When the basic polymers are used as the electrolyte membranes for fuel cells, the output of the fuel cells will be enhanced.

It is preferred that the strong acid be in a concentration sufficient to impregnate the basic polymer with eight or more strong acid molecules per polymer repeating unit of the basic polymer. Further, it is more preferred that the concentration be enough to impregnate the basic polymer with nine or more strong acid molecules per polymer repeating unit of the basic polymer.

In WO96/13872 and WO97/37396, a dopant level of not less than 200 molar per cent and that of not less than 300 molar per cent are disclosed, respectively. The former level corresponds to two or more strong acid molecules being present per polymer repeating unit of a basic polymer, and the latter level to three or more strong acid molecules, respectively.

Protic strong acids are used as the strong acid; for example, phosphoric acid and sulfuric acid are preferably used.

As used in the present specification, the "phosphoric acid" includes phosphorous acid ($H_3PO_3$), orthophosphoric acid ($H_3PO_4$), pyrophosphoric acid ($H_4P_2O_7$), triphosphoric acid ($H_5P_3O_{10}$), and metaphosphoric acid. The phosphoric acid, particularly orthophosphoric acid, has a concentration of not less than 80% by weight preferably; more preferably, a concentration of not less than 85% by weight; even more preferably, a concentration of not less than 90% by weight; and most preferably, a concentration of not less than 95% by weight. This is because the basic polymer can be impregnated with a larger number of strong acid molecules as the concentration of the strong acid increases.

In this invention, the strong acid may be heated to a predetermined temperature, and then, the basic polymer may be immersed in the heated strong acid. Preferably, the basic polymer that has been shaped into a membrane form is immersed in the strong acid. For example, the basic polymer may be shaped into the membrane form following to the doctor blade method.

Alternatively, the basic polymer may be shaped into the membrane form according to the method as described in Japanese Patent Appln. Hei 10-125560, filed May 8, 1998; entitled "Method for Producing Polyelectrolyte Membranes and Fuel Cells." Specifically, a liquid medium containing not less than 1% by weight of a basic polymer and a solvent having a boiling point or an azeotropic point of from 60° C. to 220° C. is poured into a cylinder the inner circumference of which has a cylindrical configuration; next, the cylinder is rotated. At that point, the solvent is allowed to evaporate through centrifugation by the rotation; concurrently, a polyelectrolyte membrane having a cylindrical form of almost uniform thickness is formed on the inner circumference of the cylinder. Thereafter, the polyelectrolyte membrane having a cylindrical form is cut out to yield a polyelectrolyte membrane having a film form. This method permits the basic polymer to shape into a uniform matrix within its polyelectrolyte membrane. The disclosure of Japanese Patent Appln. Hei 10-125560 is incorporated into the present specification by reference. Japanese Patent Appln. Hei 10-125560 is the priority document of U.S. Pat. No. 6,352,742.

In this invention, basic polymers are used. Such basic polymers include polybenzimidazoles, polypyridines, polypyrimidines, polyimidazoles, polybenzthiazoles, polybenzoxazoles, polyoxadiazoles, polyquinolines, polyquinoxalines, polythiadiazoles, polytetrazapyrenes, polyoxazoles, polythiazoles, polyvinylpyridines, polyvinylimidazoles, polybenzimidazoles, etc. Among these, polybenzimidazoles are preferred. The basic polymers described in WO96/13872 are also preferably used.

As the polybenzimidazoles, preferably usable are, for example, those of the following formula:

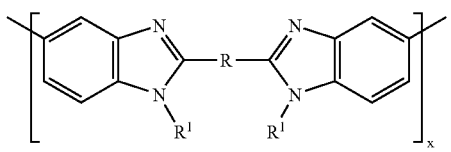

wherein R represents alkylene, perfluoroalkylene, or a substituent of any of the following formulae:

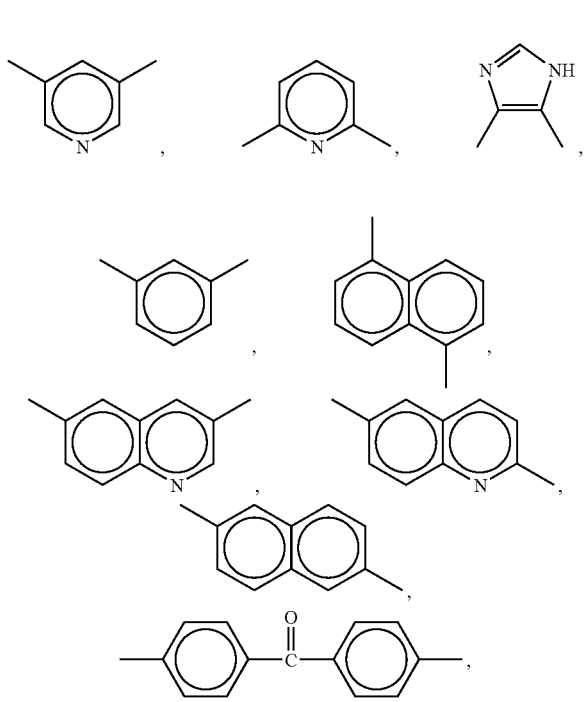

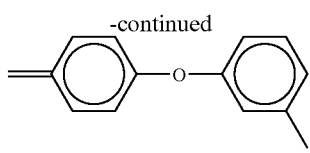

further wherein each of alkylene and perfluoroalkylene groups, which may be R, has from 1 to 10 carbons preferably, and more preferably from 1 to 6 carbons, and still further wherein $R^1$ may be the same or different and represents hydrogen, alkyl or phenyl, wherein the alkyl preferably has from 1 to 6 carbons and is optionally substituted with halogen, sulfone, or the like.

The basic polymers which may also be used are represented by the following formula:

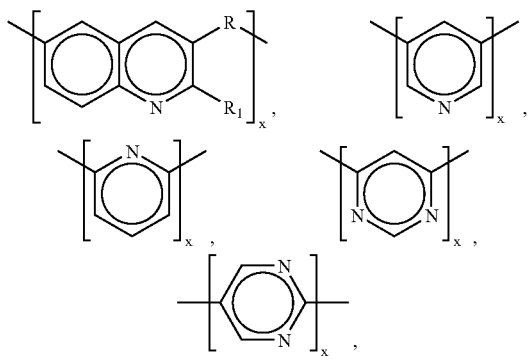

wherein R and $R^1$ are as previously defined.

Furthermore, the basic polymers which may also be used are polybenzbisimidazoles of the following formula:

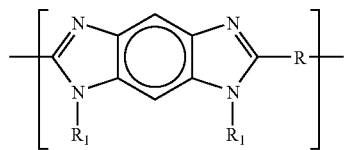

wherein R and $R^1$ are as previously above.

The polyelectrolytes obtained by this invention, viz. the complexes between the basic polymers and the strong acids, are proton conductive; therefore, they can preferably be used as the electrolytes for cells. Nevertheless, the polyelectrolytes are not be limited to be of use for cells; but they can also be used as the electrolytes for display elements, electrochromic elements or various sensors.

According to another aspect of this invention, the polyelectrolyte membranes can preferably be used in the cells for fuel cells.

In FIG. 1, a cell 10 of a fuel cell is provided with an electrolyte membrane 12 and a pair of electrodes 20 sandwiching the electrolyte membrane 12. The electrode 20 is provided with a catalyst layer 14 conducting electrode reaction and with a gas diffusion layer 22 for supplying the catalyst layer 14 with a reaction gas.

Figure 2:
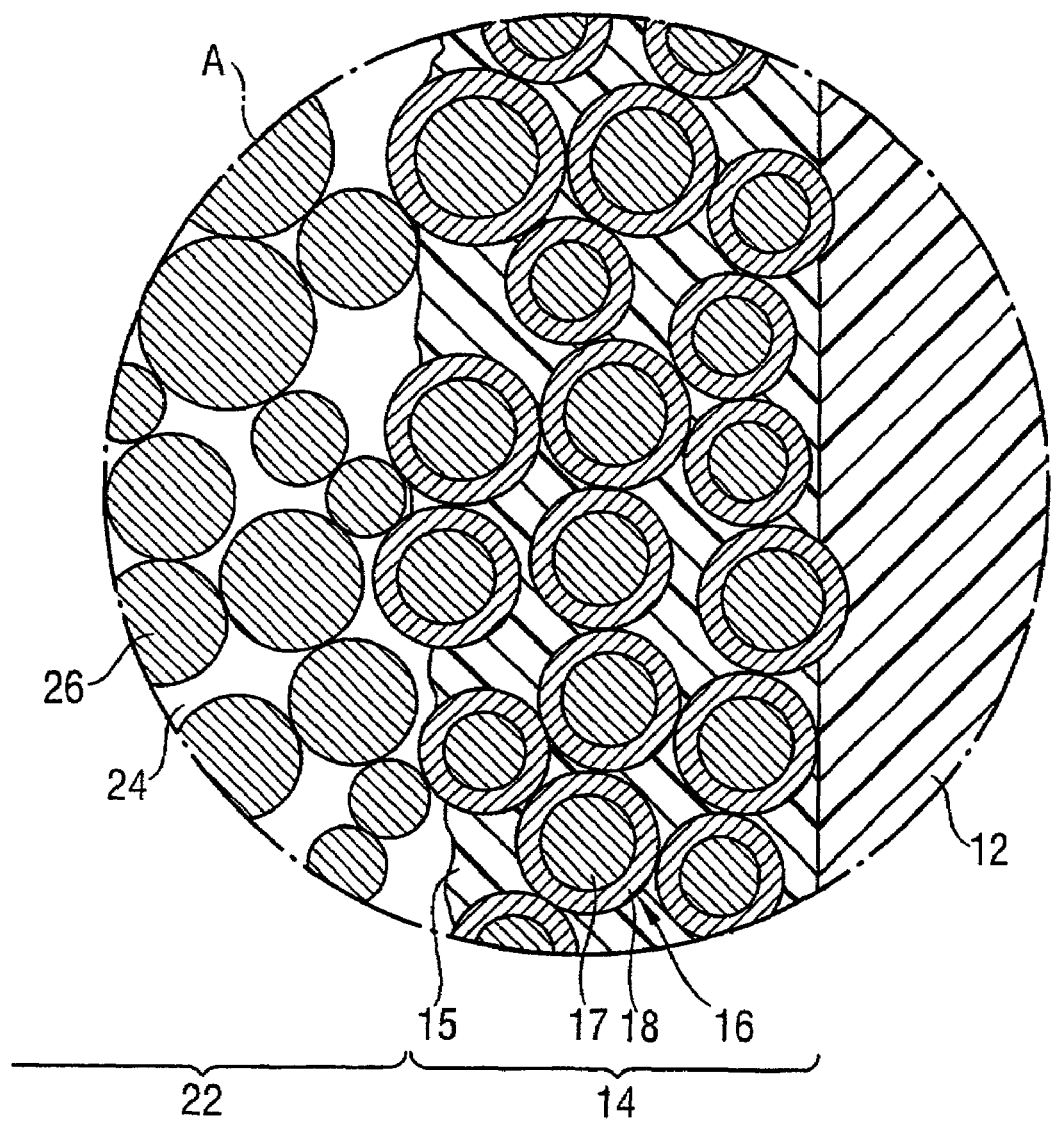
FIG. 2 is an enlarged cross section of "A" in FIG. 1.

In FIG. 2, the catalyst layer 14 is provided with a matrix 15 comprising an electrolyte membrane and with two or more catalyst particles 16 dispersed in the matrix. The matrix 15, together with the electrolyte membrane 12, forms a hydrogen ion-conducting channel. Preferably, the material for the matrix 15 is identical to the material for the electrolyte membrane 12. However, these materials may be different from each other. The matrix 15 may be porous so that the reaction gas can pass through. The catalyst particles 16 are preferably in contact with each other; this forms an electron-conducting channel.

Each of the catalyst particles 16 is provided with a conductive carrier 17 and a catalyst substance 18 supported on the surface of the conductive carrier 17. For example, particles comprising carbon are used as the conductive carrier 17. Simple substance of platinum, alloys of platinum, and the like are used as the catalyst substance 18. In FIG. 2 the catalyst substance 18 coats the surface of the conductive carrier 17, but it may be in a particulate form.

The gas diffusion layer 22 is porous so that the reaction gas can be allowed to diffuse. In FIG. 2 the gas diffusion layer 22 comprises two or more conductive particles 26 that form a gap 24. For example, particles comprising carbon are used as the conductive particles 26, and may be the same as the conductive carrier 17. Conductive substances such as carbon fiber may be used in place of the conductive particles 26.

The polyelectrolytes of this invention can be used as the electrolyte membrane 12. Thus a cell precursor having the electrolyte membrane 12 and either or both of the catalyst layers 14 can also be prepared. Moreover, a cell can then be produced by fixing the gas diffusion layer 22 to such a precursor.

EXAMPLES

The following examples are merely illustrative of this invention, and are not to be construed as limitations thereof.

Reference Example

Polybenzimidazole having the structural formula described below and having an intrinsic viscosity of 1.1 (available from Hoechst Celanese Inc.) was dissolved in N,N-dimethylacetamide to yield a solution having a resin concentration of 5.0% by weight.

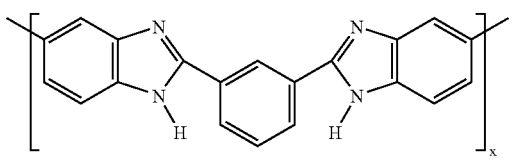

This solution, 83 g, was poured into a tubular cylinder made of stainless steel (141 mm in inner diameter and 408 mm long), and it was rotated at 1100 rpm and at 90° C. for 2 h to yield a polybenzimidazole membrane in a cylindrical form. When the thickness of the resulting polybenzimidazole membrane was measured at arbitrary 6 points, its mean membrane thickness was 30.2 μm; the deviations of the maximum value of measurement and the minimum value of measurement from the mean membrane thickness are within 1 μm.

Example 1

This polybenzimidazole was impregnated with orthophosphoric acid. The polybenzimidazole membrane (30 μm thick) was cut out in 3-cm square pieces. The films were washed with water to wash away the remaining N,N-dimethylacetamide. Then, they were dried at reduced pressure and the weights of the films were measured.

Thereafter, the dried polybenzimidazole films were placed in sample vials. To these was added each 30 ml of 85% by weight aqueous orthophosphoric acid, and immersion was carried out at temperatures and for periods of time as listed in Table 1. After lapses of the predetermined times, the polybenzimidazole films impregnated with orthophosphoric acid were removed from the phosphoric acid and excess phosphoric acid on their surfaces was thoroughly wiped off with filter papers. Subsequently, the weight increments were determined by weighing. After weighing, the polybenzimidazole films were placed in 1-l volumetric flasks, and deionized water was filled up to the measuring lines and stirred. Orthophosphoric acid was extracted from the polybenzimidazole films to obtain aqueous phosphoric acid solutions. The aqueous phosphoric acid solutions thus obtained were titrated with 0.02 N sodium hydroxide solution, and the quantities of orthophosphoric acid having impregnated the polybenzimidazole films were determined. The difference between the weight increment after impregnation with orthophosphoric acid and the weight of orthophosphoric acid of impregnation was calculated to be the quantity of the water that had been absorbed to each polybenzimidazole film impregnated with orthophosphoric acid. These results are shown in Table 1.

TABLE 1

| Sample | Temperature (° C.) of phosphoric acid | Immersion time | dried weight of PBI film (g) | film weight after impregnation with phosphoric acid (g) | impregnation quantity of phosphoric acid (g) | quantity of adsorbed water (g) | number of phosphoric acid molecules of impregnation per polymer repeating unit | number of adsorbed water molecules per polymer repeating unit |
|---|---|---|---|---|---|---|---|---|
| 1 | 50 | 5 min | 0.0692 | 0.3739 | 0.2017 | 0.088 | 9.58 | 21.69 |
| 2 | 50 | 10 min | 0.0692 | 0.3739 | 0.2217 | 0.088 | 10.08 | 18.52 |
| 3 | 50 | 30 min | 0.0720 | 0.3744 | 0.2181 | 0.084 | 9.53 | 19.22 |
| 4 | 40 | 15 min | 0.0812 | 0.4309 | 0.2524 | 0.097 | 9.78 | 20.55 |
| 5 | 40 | 20 min | 0.0713 | 0.3770 | 0.2181 | 0.088 | 9.62 | 21.07 |
| 6 | 40 | 30 min | 0.0741 | 0.3772 | 0.2181 | 0.085 | 9.26 | 19.66 |
| 7 | 40 | 55 min | 0.0695 | 0.3598 | 0.2107 | 0.079 | 9.49 | 19.44 |
| 8 | 40 | 5 h | 0.0711 | 0.3874 | 0.2279 | 0.088 | 10.09 | 21.33 |
| 9 | 23 | 1 h | 0.0722 | 0.3285 | 0.1911 | 0.065 | 8.33 | 15.47 |
| 10 | 23 | 2 h | 0.0745 | 0.3902 | 0.2328 | 0.083 | 9.83 | 19.08 |
| 11 | 23 | 3 h | 0.0701 | 0.3688 | 0.2156 | 0.083 | 9.68 | 20.32 |
| 12 | 23 | 5 h | 0.0707 | 0.3689 | 0.2106 | 0.088 | 9.38 | 21.24 |
| 13 | 23 | 24 h | 0.0581 | 0.3281 | 0.1960 | 0.074 | 10.61 | 21.79 |

From Table 1, it is understood that the use of 85% by weight orthophosphoric acid at 40° C. can remarkably shorten the time during which the impregnation quantity of orthophosphoric acid reaches its equilibrium. Especially, impregnation at 50° C. can shorten the immersion times to approximately one hundredth of the 16 h in a known method.

Example 2

Figure 3:
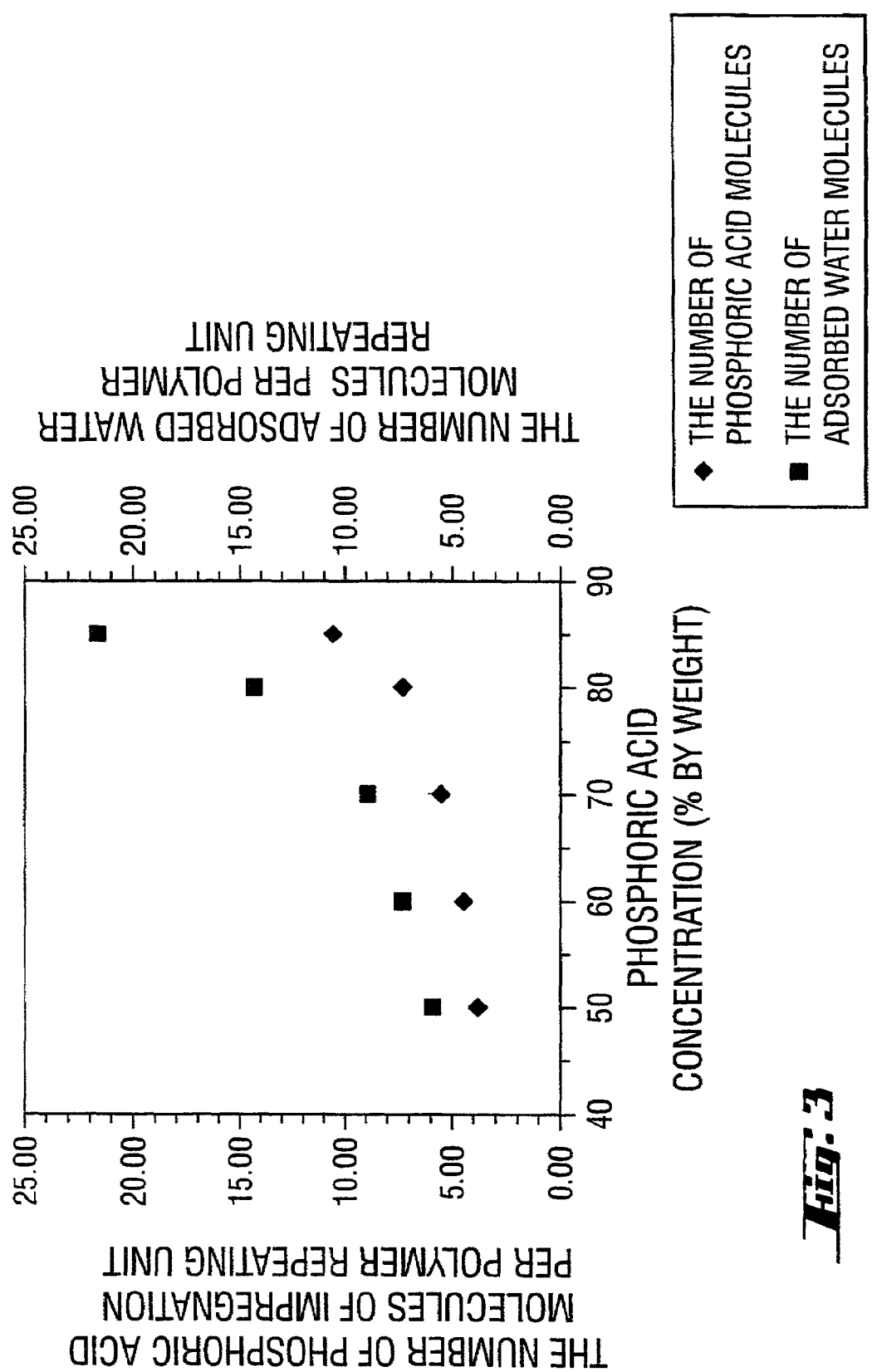
FIG. 3 is a plot illustrative of the correlation between the concentrations of phosphoric acid and the numbers of phosphoric acid molecules per polymer repeating unit of a polybenzimidazole.

According to the method of Example 1, the impregnation of orthophosphoric acid was carried out at 23° C. for 24 h by varying the concentration of orthophosphoric acid within 50-85% by weight. Thus, the relationship between the impregnation quantities of phosphoric acid and the phosphoric acid concentrations was examined. These results are shown in Table 2 and FIG. 3.

TABLE 2

| Phosphoric acid concentration (% by weight) | Dried weight of PBI film (g) | film weight after impregnation with phosphoric acid (g) | impregnation quantity of phosphoric acid (g) | quantity of adsorbed water (g) | number of phosphoric acid molecules of impregnation per polymer repeating unit | number of adsorbed water molecules per polymer repeating unit |
|---|---|---|---|---|---|---|
| 85 | 0.0581 | 0.3281 | 0.196 | 0.07396 | 10.61 | 21.79 |
| 80 | 0.0590 | 0.2457 | 0.137 | 0.04952 | 7.32 | 14.39 |
| 70 | 0.0609 | 0.2006 | 0.108 | 0.03192 | 5.57 | 8.98 |
| 60 | 0.0604 | 0.1724 | 0.086 | 0.0257 | 4.49 | 7.30 |
| 50 | 0.0587 | 0.1511 | 0.072 | 0.0206 | 3.85 | 6.00 |

From Table 2, it is understood that the higher the concentration of orthophosphoric acid is, the greater the impregnation quantity of phosphoric acid in the polybenzimidazole becomes. This correlation holds not only at room temperature, but also under warming at 40° and 50° C.

Example 3

A polybenzimidazole membrane having a thickness of 50 µm was produced according to the method of Reference Example. This polybenzimidazole membrane was immersed in 85% by weight phosphoric acid at 40° C. for 1 h to yield a polyelectrolyte membrane. This polyelectrolyte membrane was cut out in a circular piece of 7-cm diameter. Next, it was sandwiched by two sheets of carbon electrodes for a fuel cell of the polyelectrolyte type, which were commercially available, and hotpressed to yield a cell for fuel battery. When hydrogen and air were introduced into this cell and electricity was generated, a very high output of was obtained: 350 mW/cm$^2$ at 160° C. and 0.5 V under 1 atmosphere, and 650 mW/cm$^2$ at 160° C. and 0.5 V under 3 atmospheres, respectively.

The invention claimed is:

1. A method for producing a polyelectrolyte membrane, comprising the step of:
   immersing a basic polymer in a strong acid having a concentration sufficient to impregnate the basic polymer and said basic polymer being a non porous film and said impregnation is with six or more strong acid molecules per polymer repeating unit of the basic polymer at a temperature of not less than 30° C. for a period of 5 h or less wherein the strong acid has a concentration of not less than 80% by weight.

2. The method according to claim 1, wherein the immersion time is 1 hour or less.

3. The method according to claim 1, wherein the strong acid is phosphoric acid.

4. The method according to claim 2, wherein the strong acid is phosphoric acid.

5. The method according to claim 1, wherein the strong acid is sulfuric acid.

6. The method according to claim 2, wherein the strong acid is sulfuric acid.

7. The method according to claim 1, wherein the basic polymer is selected from the group consisting of polybenzimidazole, polypyridine, polypyrimidine polyimidazole, polybenzthiazole, polybenzoxazole, polyoxadiazole, polyquinoline, polyquinoxaline, polythiadiazole, polytetrazapyrene, polyoxazole, polythiazole, polyvinylpyridine, polyvinylimidazole, and polybenzimidazole.

8. The method according to claim 2, wherein the basic polymer is selected from the group consisting of polybenzimidazole, polypyridine, polypyrimidine polyimidazole, polybenzthiazole, polybenzoxazole, polyoxadiazole, polyquinoline, polyquinoxaline, polythiadiazole, polytetrazapyrene, polyoxazole, polythiazole, polyvinylpyridine, polyvinylimidazole, and polybenzimidazole.

9. The method as claimed in claim 8 wherein the temperature is 35° C. or above and the immersion is 1 hour or less.

10. The process as claimed in claim 1, wherein said temperature is 50° C. or above and the immersion time is 30 minutes or less.

11. The process as claimed in claim 2, wherein said temperature is 50° C. or above and the immersion time is 30 minutes or less.

12. The method according to claim 10 wherein said temperature is from 50° C. to 200° C.

13. A fuel cell comprising a plurality of cells, wherein the cell is provided with a polyelectrolyte membrane produced by the method according to claim 1, and with a pair of electrodes sandwiching the polyelectrolyte membrane.

14. The process as claimed in claim 8 wherein said temperature is 50° C. or above and the immersion time is 30 minutes or less and the strong acid is phosphoric acid or sulfuric acid.

15. The method according to claim 1, wherein the strong acid is phosphoric acid having a concentration of not less than 90% by weight.

16. The method according to claim 1, wherein the strong acid is phosphoric acid having a concentration of not less than 95% by weight.

* * * * *